(12) United States Patent
Shin et al.

(10) Patent No.: US 11,442,180 B2
(45) Date of Patent: Sep. 13, 2022

(54) METHOD AND SYSTEM FOR VERIFYING INTEGRITY OF GPS POSITION INFORMATION

(71) Applicant: INDUSTRY ACADEMY COOPERATION FOUNDATION OF SEJONG UNIVERSITY, Seoul (KR)

(72) Inventors: Ji Sun Shin, Seoul (KR); Byung Woon Park, Seoul (KR); Shin Cheol Lee, Seoul (KR); Ye Bin Lee, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 420 days.

(21) Appl. No.: 16/699,267

(22) Filed: Nov. 29, 2019

(65) Prior Publication Data

US 2021/0149062 A1 May 20, 2021

(30) Foreign Application Priority Data

Nov. 19, 2019 (KR) .......................... 10-2019-0148219

(51) Int. Cl.
*G01S 19/49* (2010.01)
*G01S 19/42* (2010.01)
*H04L 9/00* (2022.01)
*H04L 9/40* (2022.01)

(52) U.S. Cl.
CPC ............ *G01S 19/49* (2013.01); *G01S 19/421* (2013.01); *H04L 9/006* (2013.01); *H04L 63/0428* (2013.01)

(58) Field of Classification Search
CPC ....... G01S 19/49; G01S 19/421; H04L 9/006; H04L 63/0428; H04L 9/3247
See application file for complete search history.

(56) References Cited

U.S. PATENT DOCUMENTS

| 2016/0154112 | A1* | 6/2016 | Nichols | G01S 19/10 |
| | | | | 342/357.47 |
| 2017/0006417 | A1* | 1/2017 | Canoy | H04W 12/10 |
| 2018/0150086 | A1* | 5/2018 | Nobukawa | G08G 1/0112 |
| 2020/0322805 | A1* | 10/2020 | Wang | H04W 12/06 |
| 2021/0274462 | A1* | 9/2021 | Wiacek | G01S 5/10 |

FOREIGN PATENT DOCUMENTS

| JP | 2018074253 A | * | 5/2018 |
| KR | 10-2008-0050725 A | | 6/2008 |

* cited by examiner

*Primary Examiner* — Calvin Cheung
(74) *Attorney, Agent, or Firm* — The PL Law Group, PLLC

(57) ABSTRACT

A method and a system for verifying integrity of GPS position information according to a disclosed embodiment is a method performed in an unmanned moving object including one or more processors and a memory for storing one or more programs executed by the one or more processors. The method includes an operation of performing an authentication process for a connected base station, by the unmanned moving object, an operation of measuring a position of the unmanned moving object by performing wireless communication with a plurality of authenticated base stations, and an operation of verifying the GPS position information by comparing a value of the measured position with a position value of the GPS position information received from a satellite.

8 Claims, 8 Drawing Sheets

METHOD AND SYSTEM FOR VERIFYING INTEGRITY OF GPS POSITION INFORMATION

CROSS-REFERENCE TO RELATED APPLICATION(S)

This application claims the benefit under 35 USC § 119(a) of Korean Patent Application No. 10-2019-0148219, filed on Nov. 19, 2019, in the Korean Intellectual Property Office, the entire disclosure of which is incorporated herein by reference for all purposes.

BACKGROUND

Recently, Global Positioning System (GPS) spoofing attacks are carried out targeting drones. The GPS spoofing attacks are a technique of sending false GPS signals to induce the drones to go in a direction different from the original target direction or to misrecognize their current location. Although an additional physical device, such a receiver or the like, is added to a drone in the prior art to verify GPS position information, in this case, there is a problem in that the weight of the drone increase, and the burden of cost also increases.

SUMMARY

The disclosed embodiments are for providing a new technique for verifying integrity of GPS position information.

To accomplish the above object, according to one aspect of the present invention, there is provided a method of verifying integrity of GPS position information, performed in an unmanned moving object including one or more processors and a memory for storing one or more programs executed by the one or more processors, the method comprising: an operation of performing an authentication process for a connected base station, by the unmanned moving object; an operation of measuring a position of the unmanned moving object by performing wireless communication with a plurality of authenticated base stations; and an operation of verifying the GPS position information by comparing a value of the measured position with a position value of the GPS position information received from a satellite.

The verifying operation may include: an operation of calculating first dynamics of the unmanned moving object for a predetermined time period on the basis of the measured position value; an operation of calculating second dynamics of the unmanned moving object for a predetermined time period on the basis of the received GPS position information; and an operation of confirming whether a difference between the first dynamics and the second dynamics is within a preset error range by comparing the first dynamics and the second dynamics.

The operation of calculating first dynamics may include: an operation of calculating a moving direction and a moving speed of the unmanned moving object on the basis of the measured position value; and an operation of calculating measured-position-based dynamics by accumulating the calculated moving direction and moving speed for a predetermined time period.

The operation of calculating second dynamics may include: an operation of calculating a moving direction and a moving speed of the unmanned moving object on the basis of the received GPS position information; and an operation of calculating GPS-position-based dynamics by accumulating the calculated moving direction and moving speed for a predetermined time period.

The operation of performing an authentication process may include: an operation of transmitting a random number (nonce) to the base station, by the unmanned moving object; an operation of creating a signature value by signing the random number using a secrete key $sk_{ID}$ corresponding to its own identification information (ID), by the base station; and an operation of verifying validity of the signature value received from the base station, by the unmanned moving object.

The base station may transmit the identification information (ID) to an authentication server and receive the secrete key $sk_{ID}$ corresponding to the identification information (ID).

The unmanned moving object may verify validity of the signature value by using a master public key previously issued by the authentication server and stored in the unmanned moving object.

According to another embodiment of the present invention, there is provided a system for verifying integrity of GPS position information of an unmanned moving object, the unmanned moving object comprising: an authentication unit for performing an authentication process for a connected base station, by an unmanned moving object; a position measurement unit for measuring a position of the unmanned moving object by performing wireless communication with a plurality of authenticated base stations; and position verification unit for verifying the GPS position information by comparing a value of the measured position with a position value of the GPS position information received from a satellite.

The position verification unit may calculate first dynamics of the unmanned moving object for a predetermined time period on the basis of the measured position value, calculate second dynamics of the unmanned moving object for a predetermined time period on the basis of the received GPS position information, and confirm whether a difference between the first dynamics and the second dynamics is within a preset error range by comparing the first dynamics and the second dynamics.

The position verification unit may calculate a moving direction and a moving speed of the unmanned moving object on the basis of the measured position value, and calculate measured-position-based dynamics by accumulating the calculated moving direction and moving speed for a predetermined time period.

The position verification unit may calculate a moving direction and a moving speed of the unmanned moving object on the basis of the received GPS position information, and calculate GPS-position-based dynamics by accumulating the calculated moving direction and moving speed for a predetermined time period.

The authentication unit may transmit a random number (nonce) to the base station, and verify, when the base station signs the random number using a secrete key skip corresponding to its own identification information (ID) and transmits a signature value to the unmanned moving object, validity of the signature value received from the base station.

The base station may transmit the identification information (ID) to an authentication server and receive the secrete key skip corresponding to the identification information (ID).

The authentication unit may verify validity of the signature value by using a master public key previously issued by the authentication server and stored in the unmanned moving object.

DETAILED DESCRIPTION

Figure 1:
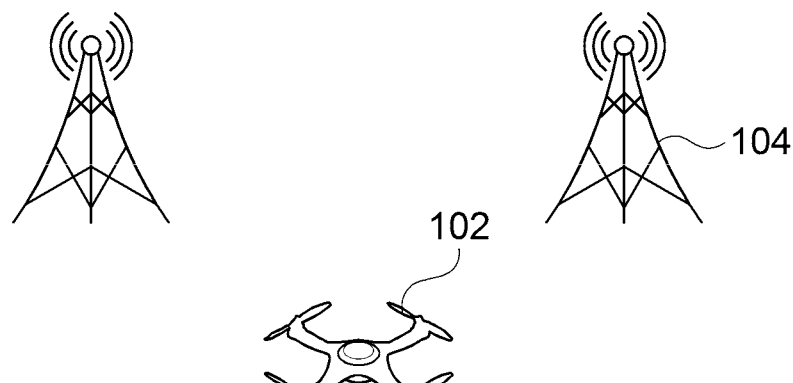
FIG. 1 is a view showing the configuration of a system for verifying integrity of GPS position information according to an embodiment of the present invention.
Figure 1:
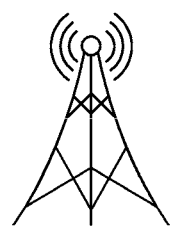
Figure 1:
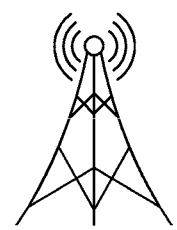

Hereafter, specific embodiments of the present invention will be described with reference to the accompanying drawings. The detailed description is provided below to help comprehensive understanding of the methods, apparatuses and/or systems described in this specification. However, these are only an example, and the present invention is not limited thereto.

In describing the embodiments of the present invention, when it is determined that specific description of known techniques related to the present invention unnecessarily blurs the gist of the present invention, the detailed description will be omitted. In addition, the terms described below are terms defined considering the functions of the present invention, and these may vary according to user, operator's intention, custom or the like. Therefore, definitions thereof should be determined on the basis of the full text of the specification. The terms used in the detailed description are only for describing the embodiments of the present invention and should not be restrictive. Unless clearly used otherwise, expressions of singular forms include meanings of plural forms. In the description, expressions such as "include", "provide" and the like are for indicating certain features, numerals, steps, operations, components, some of these, or a combination thereof, and they should not be interpreted to preclude the presence or possibility of one or more other features, numerals, steps, operations, components, some of these, or a combination thereof, in addition to those described above.

In the below description, the terms such as "transmission", "communication", "sending" and "receiving" of a signal or information and other meanings similar thereto include not only direct transfer of the signal or information from one component to another, but also transfer of the signal or information through another component. Particularly, "transmission" or "sending" of a signal or information to a component indicates the final destination of the signal or the information, not direct transfer to the destination. This is the same in the case of "receiving" a signal or information. In addition, in the specification, that two or more pieces of data or information are "related" means that if one of the data (or information) is acquired, at least some of the other data (or information) may be obtained on the basis of the acquired data (or information).

Meanwhile, directional terms such as up, down, one side, the other side and the like are used in relation to the orientation of the disclosed drawings. Since the components of the embodiments of the present invention may be positioned in various orientations, the directional terms are used for illustrative purposes and do not limit the orientations.

In addition, although the terms such as 'first', 'second' and the like may be used to describe various components, the components should not be limited by the terms. The terms may be used for the purpose of distinguishing one component from the other components. For example, a first component may be named as a second component without departing from the scope of the present invention, and similarly, the second component may be named as the first component.

FIG. 1 is a view showing the configuration of a system for verifying integrity of GPS position information according to an embodiment of the present invention.

Referring to FIG. 1, a system 100 for verifying integrity of GPS position information may include an unmanned moving object 102, and a plurality of base stations 104. The base station 104 may be referred to as an access point according to the type of a communication network.

Here, the unmanned moving object 102 is connected to communicate with the plurality of base stations 104 through a communication network (not shown). In some embodiments, the communication network may include the Internet, one or more of local area networks, wide area networks, cellular networks, mobile networks, and other kinds of networks, and a combination of these networks.

The unmanned moving object 102 is a moving means which can move by a remote control technique or an autonomous driving technique. In an exemplary embodiment, although the unmanned moving object 102 may include an unmanned flight object such as a drone, an autonomous vehicle and the like, it is not limited thereto. The unmanned moving object 102 does not necessarily mean a case of moving without a person on board, and does not exclude a case of moving with a person on board.

The unmanned moving object 102 may transmit a predetermined data (e.g., data collected by the unmanned moving object 102) to the base station 104. At this point, the unmanned moving object 102 may perform an authentication process to identify whether the base station 104 is an authorized base station. That is, the unmanned moving object 102 may confirm whether a connected base station 104 is an authorized base station or a falsified base station (fake base station) through the authentication process.

In addition, the unmanned moving object 102 may verify the position of the unmanned moving object 102. The unmanned moving object 102 may verify the position of the unmanned moving object 102 by comparing its own position grasped from a connected base station 104 with a position obtained from GPS position information. When verification of the position fails, the unmanned moving object 102 may not transmit data to the base station 104 although the authentication process of the base station 104 is successful.

Figure 2:
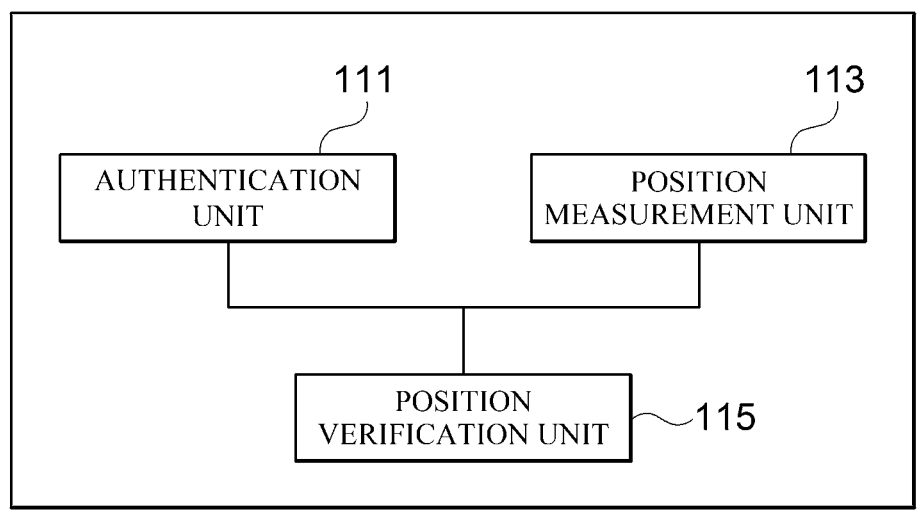
FIG. 2 is a block diagram showing the configuration of an unmanned moving object according to an embodiment of the present invention.

FIG. 2 is a block diagram showing the configuration of an unmanned moving object 102 according to an embodiment of the present invention. Referring to FIG. 2, the unmanned moving object 102 may include an authentication unit 111, a position measurement unit 113, and a position verification unit 115.

The authentication unit 111 may confirm whether a connected base station 104 is an authorized base station or a falsified base station through the authentication process.

The position measurement unit 113 may measure the position of the unmanned moving object 102 by performing wireless communication with a plurality of base stations 104. The position measurement unit 113 may previously store identification information (e.g., ID or the like) and position information (e.g., value of coordinates in the space) of the plurality of base stations 104. The position measurement unit 113 may measure the position of the unmanned moving object 102 through various position measurement methods.

Embodiment 1: ToA (Time of Arrival)

Figure 3:
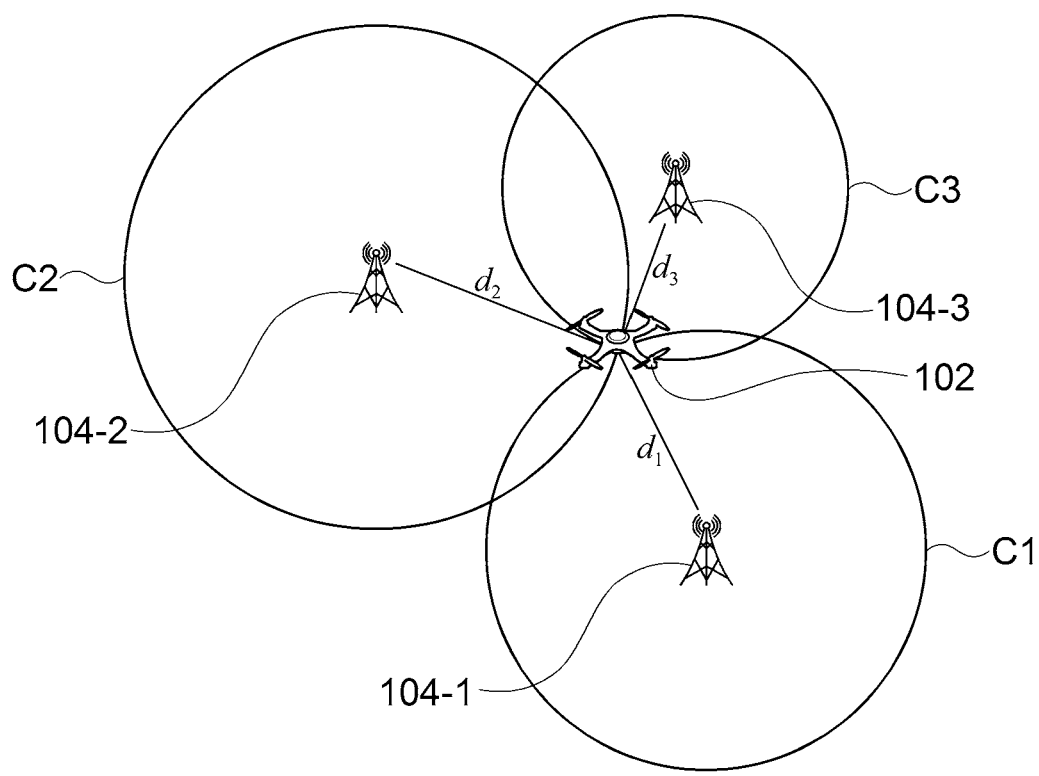
FIG. 3 is a view showing a state of measuring the position of an unmanned moving object through a ToA method by a position measurement unit according to a disclosed embodiment.

FIG. 3 is a view showing a state of measuring the position of an unmanned moving object 102 through a ToA method by the position measurement unit 113 according to a disclosed embodiment. Here, it shows a case in which the unmanned moving object 102 measures the position of the unmanned moving object 102 by performing wireless communication with three base stations 104-1, 104-2 and 104-3.

Referring to FIG. 3, the position measurement unit 113 may measure the position of the unmanned moving object 102 by using the distances $d_1$, $d_2$ and $d_3$ between the unmanned moving object 102 and the base stations 104-1, 104-2 and 104-3 and position information of the base stations 104-1, 104-2 and 104-3.

Here, the distances $d_1$, $d_2$ and $d_3$ between the unmanned moving object 102 and the base stations 104-1, 104-2 and 104-3 may be calculated by multiplying an arrival time of a signal between the unmanned moving object 102 and the base stations 104-1, 104-2 and 104-3 by the speed of light. In addition, when circles are drawn around the base stations 104-1, 104-2 and 104-3 using the distances $d_1$, $d_2$ and $d_3$ from the base stations to the unmanned moving object as a radius, a point where the three circles C1, C2 and C3 intersect is the position of the unmanned vehicle 102.

Embodiment 2: TDoA (Time Difference of Arrival)

Figure 4:
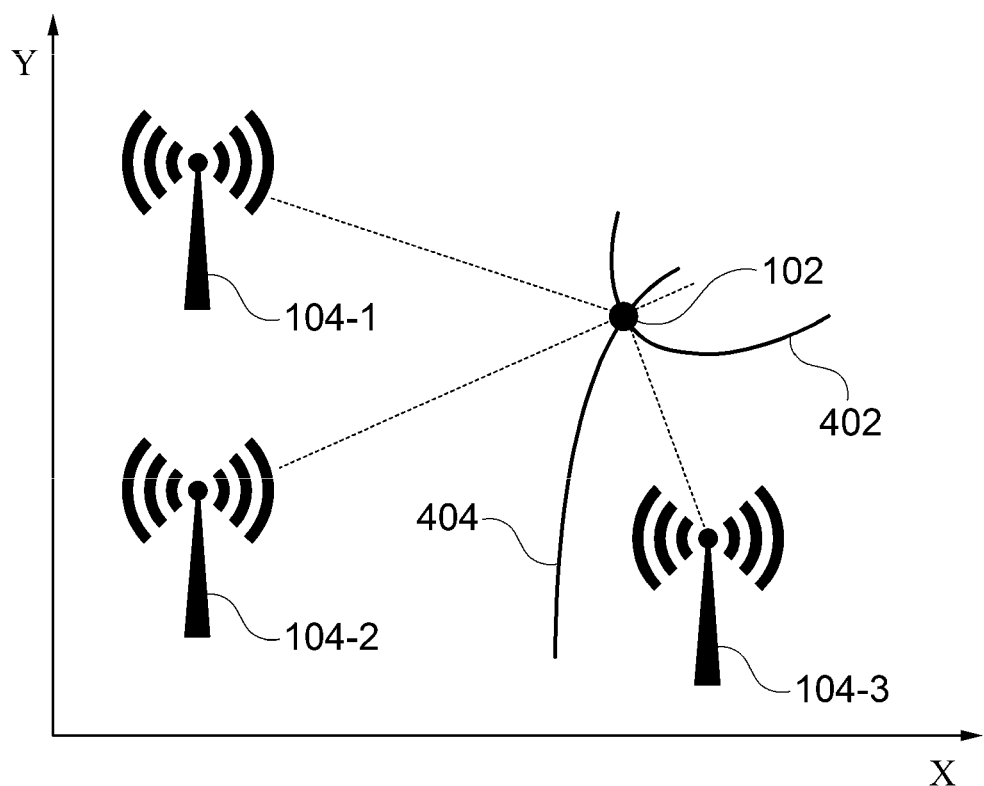
FIG. 4 is a view showing a state of measuring the position of an unmanned moving object through a TDoA method by a position measurement unit according to a disclosed embodiment.

FIG. 4 is a view showing a state of measuring the position of an unmanned moving object 102 through a TDoA method by the position measurement unit 113 according to a disclosed embodiment. Here, it shows a case in which the unmanned moving object 102 measures the position of the unmanned moving object 102 by performing wireless communication with three base stations 104-1, 104-2 and 104-3. In this embodiment, it is assumed that the three base stations 104-1, 104-2 and 104-3 are synchronized in time.

Referring to FIG. 4, the position measurement unit 113 may receive a measurement signal from each of the base stations 104-1, 104-2 and 104-3. The position measurement unit 113 may calculate a relative difference of the arriving time of the measurement signals received from the base stations 104-1, 104-2 and 104-3. The position measurement unit 113 may display hyperbolic curves around the unmanned moving body 102 on the basis of the relative difference of the calculated arrival time and measure the position of the unmanned moving object 102 through the intersection point of the hyperbolic curves. For example, if it is assumed, in FIG. 4, that a first hyperbolic curve 402 represents the relative difference of arrival time of the measurement signals received from the base station 104-1 and the base station 104-3 and a second hyperbolic curve 404 represents the relative difference of arrival time of the measurement signals received from the base station 104-2 and the base station 104-3, the position measurement unit 113 may determine the intersection point of the two hyperbolic curves as the position of the unmanned moving object 102.

Embodiment 3: RSSI (Received Signal Strength Indicator)

Figure 5:
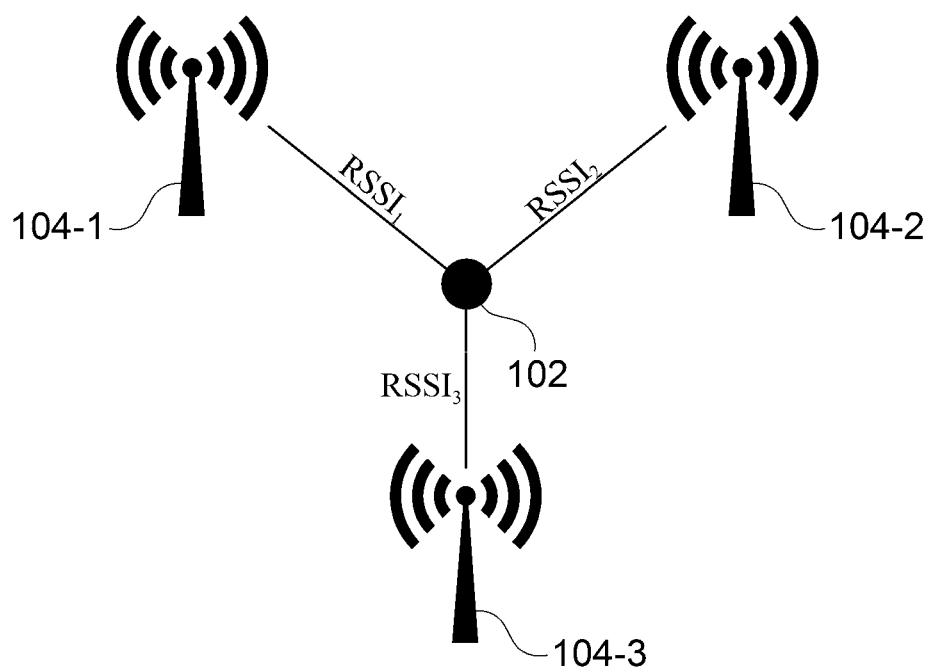
FIG. 5 is a view showing a state of measuring the position of an unmanned moving object through a RSSI method by a position measurement unit according to a disclosed embodiment.

FIG. 5 is a view showing a state of measuring the position of an unmanned moving object 102 through a RSSI method by the position measurement unit 113 according to a disclosed embodiment. Here, it shows a case in which the unmanned moving object 102 measures the position of the unmanned moving object 102 by performing wireless communication with three base stations 104-1, 104-2 and 104-3.

Referring to FIG. 5, the position measurement unit 113 may measure the position of the unmanned moving object 102 by using the received signal strength indicators $RSSI_1$, $RSSI_2$ and $RSSI_3$ between the unmanned moving object 102 and the base stations 104-1, 104-2 and 104-3 and the position information of the base stations 104-1, 104-2 and 104-3. Since the received signal strength indicator RSSI is related to the distance d between the unmanned moving object and the base station as shown below in mathematical expression 1, the position measurement unit 113 may obtain the distance d between the unmanned moving object and the base station by measuring the received signal strength indicator.

$$RSSI = -10n \times \log(d) + \text{TxPower} \quad \text{(Mathematical expression 1)}$$

Here, n denotes a propagation loss coefficient, d denotes the distance between the unmanned moving object and a base station, and TxPower denotes magnitude of transmission power when the unmanned moving object or a base station transmits a signal.

In addition, when a circle is drawn around each of the base stations 104-1, 104-2 and 104-3 using the distance from the base station to the unmanned moving object as a radius, a point where the three circles intersect is the position of the unmanned vehicle 102.

The position measurement unit 113 may measure the position of the unmanned moving object 102 by using other various position measurement techniques (e.g., Angle of Arrival (AOA) method and the like).

The position verification unit 115 may verify GPS position information by comparing the position value measured by the position measurement unit 113 of the unmanned moving object 102 with the position value obtained from the GPS position information. Specifically, the position verification unit 115 may verify the GPS position information according to whether the difference between the position value measured by the position measurement unit 113 and the GPS position value received from a satellite is within a preset error range. When the difference between the measured position value and the received GPS position value is within the preset error range, the position verification unit 115 may determine that verification of the position is successful. When the difference between the measured position value and the received GPS position value is out of the preset error range, the position verification unit 115 may determine that verification of the position has failed. When verification of the position has failed, the unmanned moving object 102 may not transmit data to the base station 104.

In addition, the position verification unit 115 may verify GPS position information on the basis of dynamics including a moving direction and a moving speed of the unmanned moving object 102 for a predetermined time period. Specifically, the position verification unit 115 may calculate dynamics (first dynamics) of the unmanned moving object 102 for a predetermined time period on the basis of the position value of the unmanned moving object 102 measured through the position measurement unit 113. In addition, the position verification unit 115 may calculate dynamics (second dynamics) of the unmanned moving object 102 by calculating the moving direction and the moving speed of the unmanned moving object 102 on the basis of the GPS position information and accumulating the calculated moving direction and moving speed for a predetermined time period.

In an exemplary embodiment, the position measurement unit 113 may calculate dynamics of the unmanned moving object 102 by calculating the moving direction and the moving speed of the unmanned moving object 102 on the basis of the measured position of the unmanned moving object 102 and accumulating the calculated moving direction and moving speed for a predetermined time period. Here, the dynamics calculated on the basis of the position value measured by the position measurement unit 113 may be referred to as measured-position-based dynamics (first dynamics).

In addition, the position measurement unit 113 may calculate dynamics of the unmanned moving object 102 by calculating the moving direction and the moving speed of the unmanned moving object 102 on the basis of the position value obtained from the GPS position information and accumulating the calculated moving direction and moving speed for a predetermined time period. Here, the dynamics calculated on the basis of the position value obtained from the GPS position information may be referred to as GPS-position-based dynamics (second dynamics).

The position verification unit 115 may verify GPS position information by comparing the first dynamics and the second dynamics of the unmanned moving object 102 calculated for a predetermined time period. Specifically, the position verification unit 115 may verify the GPS position information according to whether the difference between the first dynamics and the second dynamics is within a preset error range.

Figure 6:
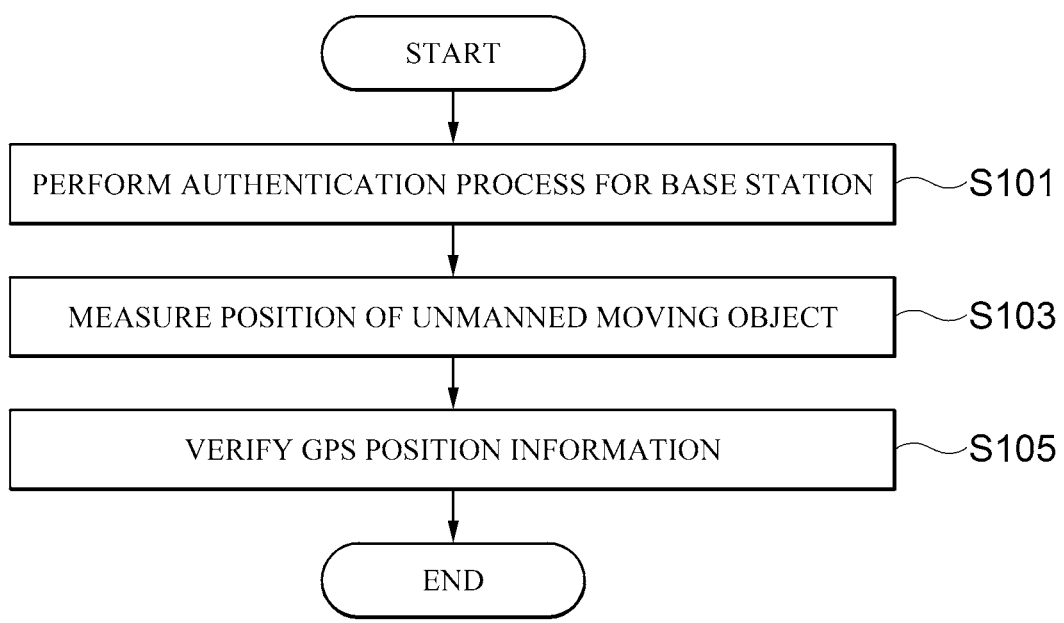
FIG. 6 is a flowchart illustrating a method of verifying integrity of GPS position information according to a disclosed embodiment.

FIG. 6 is a flowchart illustrating a method of verifying integrity of GPS position information according to an embodiment of the present invention. Although the method is described as being divided in a plurality of steps in the flowchart shown in the figure, at least some of the steps may be performed in a different order or in combination and together with the other steps, omitted, divided into detailed steps, or performed in accompany with one or more steps not shown in the figure.

Referring to FIG. 6, the unmanned moving object 102 performs an authentication process for a connected base station 104 (step S101). That is, the unmanned moving object 102 performs an authentication process of confirming whether the connected base station 104 is an authorized base station.

Next, the unmanned moving object 102 measures the position of the unmanned moving object 102 by performing wireless communication with a plurality of base stations 104 (step S103). Here, the plurality of base stations 104 may be authorized base stations.

Next, the unmanned moving object 102 verifies GPS position information by comparing the measured-position-based dynamics measured at step S103 with GPS-position-based dynamics (step S105). In an embodiment, the unmanned moving object 102 may verify the GPS position information by calculating dynamics (first dynamics) of the unmanned moving object 102 for a predetermined time period on the basis of the position of the unmanned moving object 102 measured at step S103, and comparing the calculated dynamics with the GPS-based dynamics (second dynamics).

Figure 7:
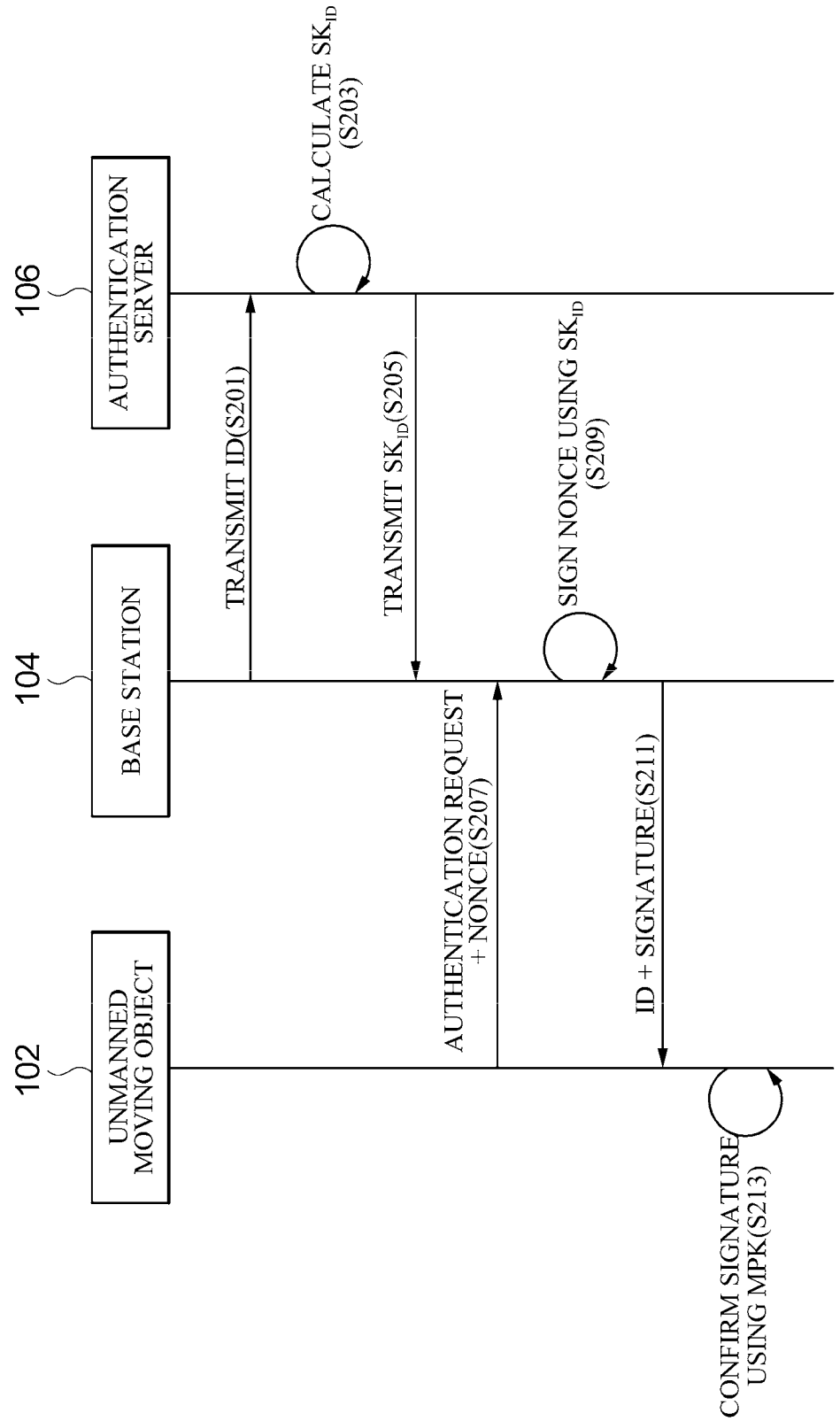
FIG. 7 is a flowchart illustrating a method of authenticating a base station according to a disclosed embodiment.

FIG. 7 is a flowchart illustrating a method of authenticating a base station according to a disclosed embodiment. Although the method is described as being divided in a plurality of steps in the flowchart shown in the figure, at least some of the steps may be performed in a different order or in combination and together with the other steps, omitted, divided into detailed steps, or performed in accompany with one or more steps not shown in the figure.

Referring to FIG. 7, the base station 104 transmits its identification information (ID) to the authentication server 106 (step S201). At this point, the identification information (ID) becomes the public key of the base station 104. The authentication server 106 may be a server of a certificate authority (CA) that the base station 104 and the unmanned moving object 102 may trust.

Next, the authentication server 106 calculates a secret key skip corresponding to the identification information (ID) by using its own master secrete key msk (step S203).

Next, the authentication server 106 transmits the calculated secret key skip to the base station 104 (step S205).

Next, the unmanned moving object 102 approaching a base station 104 requests authentication from the base station 104 (step S207). At this point, the unmanned moving object 102 may transmit a nonce, which is a random number, together with an authentication request.

The base station 104 receiving the authentication request and the nonce creates a signature value σ by signing the nonce using its own secrete key skip (step S209). In an embodiment, the signature value σ may be created as shown below in the mathematical expression 2.

$$\sigma = \text{sign}(sk_{ID}, \text{nonce}) \qquad \text{(Mathematical expression 2)}$$

Next, the base station 104 transmits its own identification information (ID) and the signature value σ created at step S209 to the unmanned moving object 102 (step S211).

Next, the unmanned moving object 102 confirms validity of the received signature value by using a previously stored master public key mpk (step S213). The master public key may be a key issued by the authentication server 106 and safely stored in the unmanned moving object 102 in advance. In an embodiment, the unmanned moving object 102 may confirm validity of the received signature value by using mathematical expression 3 shown below.

$$\text{Verify}(mpk, ID, \sigma) \rightarrow \text{Return 1 if the signature value is valid, otherwise return 0.} \qquad \text{(Mathematical expression 3)}$$

Figure 8:
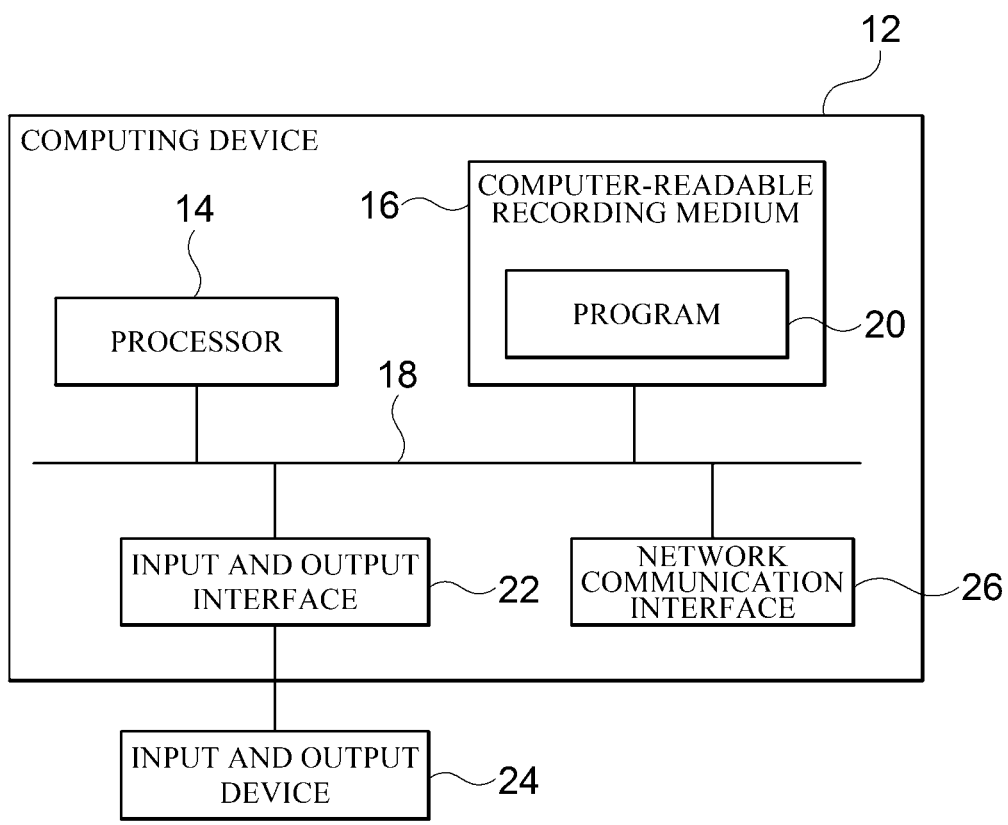
FIG. 8 is a block diagram showing an example of a computing environment including a computing device appropriate to be used in exemplary embodiments.

FIG. 8 is a block diagram showing an example of a computing environment 10 including a computing device appropriate to be used in exemplary embodiments. In the embodiment shown in the figure, each of the components may have a different function and ability in addition to those described below, and additional components other than those described below may be included.

The computing environment 10 shown in the figure includes a computing device 12. In an embodiment, the computing device 12 may be an unmanned moving object 102 and 202. In addition, the computing device 12 may be a base station 104 and 204. In addition, the computing device 12 may be an authentication server 206.

The computing device 12 includes at least a processor 14, a computer-readable storage medium 16, and a communication bus 18. The processor 14 may direct the computing device 12 to operate according to the exemplary embodiments described above. For example, the processor 14 may execute one or more programs stored in the computer-readable storage medium 16. The one or more programs may include one or more computer executable commands, and the computer executable commands may be configured to direct the computing device 12 to perform operations according to the exemplary embodiment when the commands are executed by the processor 14.

The computer-readable storage medium 16 is configured to store computer-executable commands and program codes, program data and/or information of other appropriate forms. The programs 20 stored in the computer-readable storage medium 16 include a set of commands that can be executed by the processor 14. In an embodiment, the computer-readable storage medium 16 may be memory (volatile memory such as random access memory, non-volatile memory, or an appropriate combination of these), one or more magnetic disk storage devices, optical disk storage devices, flash memory devices, other forms of storage media that can be accessed by the computing device 12 and is capable of storing desired information, or an appropriate combination of these.

The communication bus 18 interconnects various different components of the computing device 12, including the processor 14 and the computer-readable storage medium 16.

The computing device 12 may also include one or more input and output interfaces 22 and one or more network communication interfaces 26, which provide an interface for one or more input and output devices 24. The input and output interfaces 22 and the network communication interfaces 26 are connected to the communication bus 18. The input and output devices 24 may be connected to other components of the computing device 12 through the input and output interfaces 22. Exemplary input and output devices 24 may include input devices such as a pointing device (a mouse, a track pad, etc.), a keyboard, a touch input device (a touch pad, a touch screen, etc.), a voice or sound input device, various kinds of sensor devices and/or photographing devices, and/or output devices such as a display device, a printer, a speaker and/or a network card. The exemplary input and output devices 24 may be included inside the computing device 12 as a component configuring the computing device 12 or may be connected to the computing device 12 as a separate apparatus distinguished from the computing device 12.

According to the disclosed embodiments, since a base station connected by an unmanned moving object is authenticated and GPS position information is compared with a real position of the unmanned moving object, it is possible to deal with GPS spoofing attacks without separately providing an additional device.

Although representative embodiments of the present invention have been described above in detail, it should be understood that those skilled in the art may make diverse modifications on the embodiments described above without departing from the scope of the present invention. Therefore, the scope of the present invention should not be defined to be limited to the embodiments described above and should be defined by the claims described below and those equivalent to the claims.

What is claimed is:

1. A method of verifying integrity of global positioning system (GPS) position information, performed in an unmanned moving object including one or more processors and a memory for storing one or more programs executed by the one or more processors, the method comprising:
    an operation of performing an authentication process for a connected base station, by the unmanned moving object;
    an operation of measuring a position of the unmanned moving object by performing wireless communication with a plurality of authenticated base stations; and
    an operation of verifying the GPS position information by comparing a value of the measured position with a position value of the GPS position information received from a satellite,
    wherein, when the authentication process has succeeded, but the verification of the GPS position information fails, the unmanned moving object does not transmit data to the base station,
    wherein the operation of the verifying comprises:
        an operation of calculating first dynamics of the unmanned moving object for a predetermined time period on the basis of the measured position value;
        an operation of calculating second dynamics of the unmanned moving object for a predetermined time period on the basis of the received GPS position information;
        an operation of confirming whether a difference between the first dynamics and the second dynamics is within a preset error range by comparing the first dynamics and the second dynamics to determine whether a GPS spoofing attack is performed on the unmanned mobile vehicle,
    wherein the operation of calculating the first dynamics includes:
        an operation of calculating a moving direction and a moving speed of the unmanned moving object on the basis of the measured position value; and
        an operation of calculating measured-position-based dynamics by accumulating the calculated moving direction and moving speed for a predetermined time period; and
    the operation of calculating the second dynamics includes:
        an operation of calculating a moving direction and a moving speed of the unmanned moving object on the basis of the received GPS position information; and
        an operation of calculating GPS-position-based dynamics by accumulating the calculated moving direction and moving speed for a predetermined time period.

2. The method according to claim 1, wherein the operation of performing the authentication process includes:
    an operation of transmitting a random number (nonce) to the base station, by the unmanned moving object;
    an operation of creating a signature value by signing the random number using a secret key skID corresponding to its own identification information (ID), by the base station; and
    an operation of verifying validity of the signature value received from the base station, by the unmanned moving object.

3. The method according to claim 2, wherein the base station transmits the identification information (ID) to an authentication server and receives the secret key skID corresponding to the identification information (ID).

4. The method according to claim 3, wherein the unmanned moving object verifies validity of the signature value by using a master public key previously issued by the authentication server and stored in the unmanned moving object.

5. A system for verifying integrity of global positioning system (GPS) position information of an unmanned moving object, the unmanned moving object comprising:
- an authentication unit configured to perform an authentication process for a connected base station, by an unmanned moving object;
- a position measurement unit configured to measure a position of the unmanned moving object by performing wireless communication with a plurality of authenticated base stations; and
- a position verification unit configured to verify the GPS position information by comparing a value of the measured position with a position value of the GPS position information received from a satellite,
- wherein, when the authentication process has succeeded, but the verification of the GPS position information fails, the unmanned moving object does not transmit data to the base station,
- wherein the position verification unit is configured to:
  - calculate a moving direction and a moving speed of the unmanned moving object on the basis of the measured position value, and calculates measured-position-based dynamics by accumulating the calculated moving direction and moving speed for a predetermined time period;
  - calculate a moving direction and a moving speed of the unmanned moving object on the basis of the received GPS position information, and calculates GPS-position-based dynamics by accumulating the calculated moving direction and moving speed for a predetermined time period; and
  - confirm whether a difference between the measured-position-based dynamics and the GPS-position-based dynamics is within a preset error range by comparing the first dynamics and the second dynamics to determine whether a GPS spoofing attack is performed on the unmanned mobile vehicle.

6. The system according to claim 5, wherein the authentication unit transmits a random number (nonce) to the base station, and verifies, when the base station signs the random number using a secret key skID corresponding to its own identification information (ID) and transmits a signature value to the unmanned moving object, validity of the signature value received from the base station.

7. The system according to claim 6, wherein the base station transmits the identification information (ID) to an authentication server and receives the secret key skID corresponding to the identification information (ID).

8. The system according to claim 7, wherein the authentication unit verifies validity of the signature value by using a master public key previously issued by the authentication server and stored in the unmanned moving object.

* * * * *